(12) United States Patent
Miksch

(10) Patent No.: US 8,885,049 B2
(45) Date of Patent: Nov. 11, 2014

(54) METHOD AND DEVICE FOR DETERMINING CALIBRATION PARAMETERS OF A CAMERA

(75) Inventor: Michael Miksch, Fellbach (DE)

(73) Assignee: Sony Corporation, Tokyo (JP)

( * ) Notice: Subject to any disclaimer, the term of this patent is extended or adjusted under 35 U.S.C. 154(b) by 369 days.

(21) Appl. No.: 13/026,383

(22) Filed: Feb. 14, 2011

(65) Prior Publication Data

US 2011/0228101 A1    Sep. 22, 2011

(30) Foreign Application Priority Data

Mar. 19, 2010    (EP) .................................... 10002960

(51) Int. Cl.
*H04N 17/06* (2006.01)
*H04N 7/00* (2011.01)
*H04N 7/18* (2006.01)
*H04N 17/00* (2006.01)

(52) U.S. Cl.
CPC .................................. *H04N 17/002* (2013.01)
USPC ............................ 348/175; 348/118; 348/148

(58) Field of Classification Search
CPC .................................................. G06K 9/00791
USPC .................................................. 348/148, 175
See application file for complete search history.

(56) References Cited

U.S. PATENT DOCUMENTS

| | | | | |
|---|---|---|---|---|
| 6,956,469 | B2 * | 10/2005 | Hirvonen et al. | 340/435 |
| 2004/0056950 | A1 * | 3/2004 | Takeda | 348/92 |
| 2004/0057599 | A1 * | 3/2004 | Okada et al. | 382/103 |
| 2009/0290032 | A1 * | 11/2009 | Zhang et al. | 348/211.9 |

\* cited by examiner

*Primary Examiner* — Hee-Yong Kim
*Assistant Examiner* — Matthew Kwan
(74) *Attorney, Agent, or Firm* — Oblon, Spivak, McClelland, Maier & Neustadt, L.L.P.

(57) ABSTRACT

A method of determining calibration parameters of a camera comprises taking a first image of an object, taking a second image of the object, wherein the position of the camera with respect to the object is changed between the first and the second image, the calibration parameters of the camera being fixed between the first and the second image, determining a transformation that is adapted to transform a portion of the first into a corresponding portion of the second image, and determining the calibration parameters from the transformation.

9 Claims, 4 Drawing Sheets

*Fig.3A*
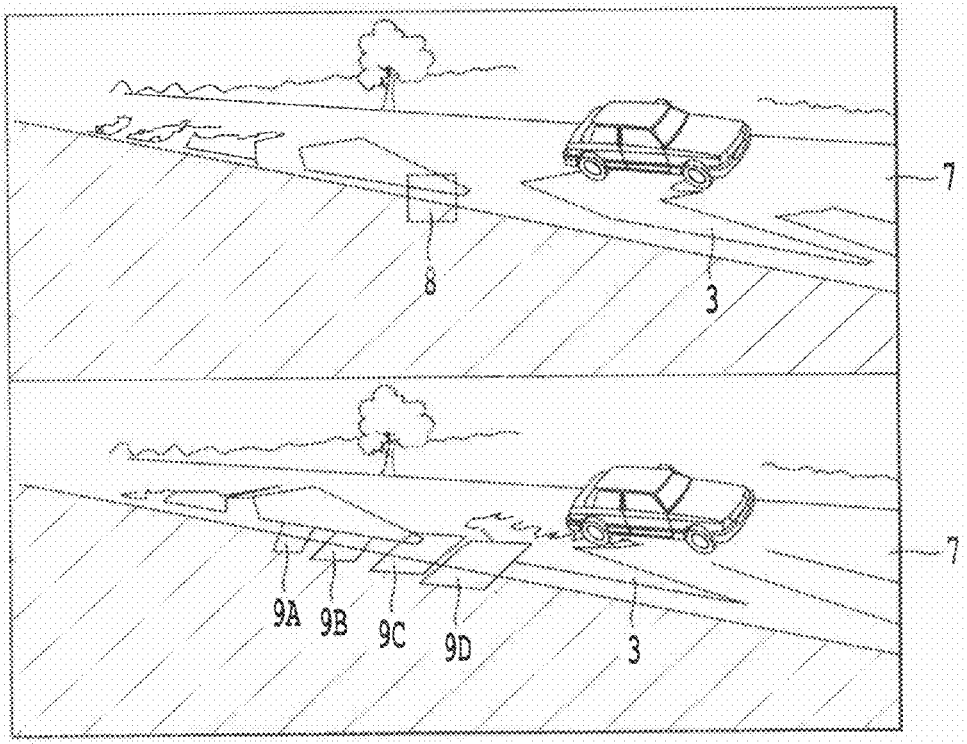
*Fig.3B*
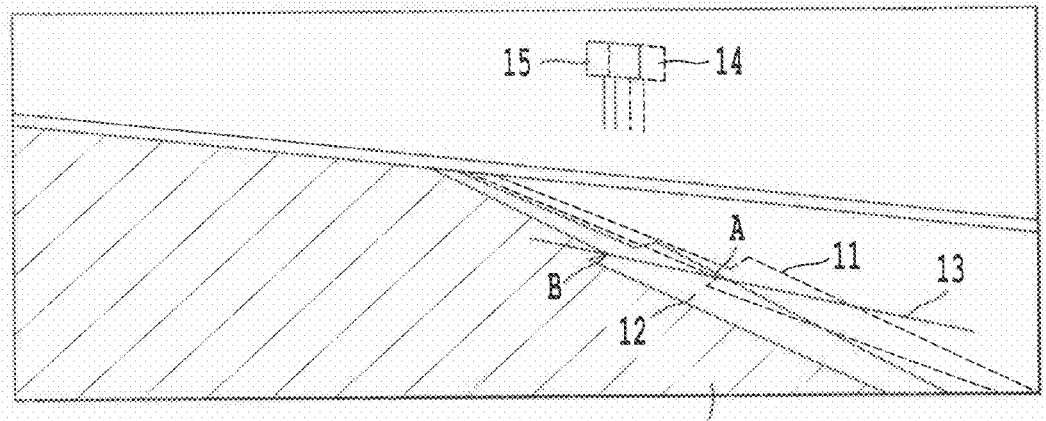
*Fig.4A*

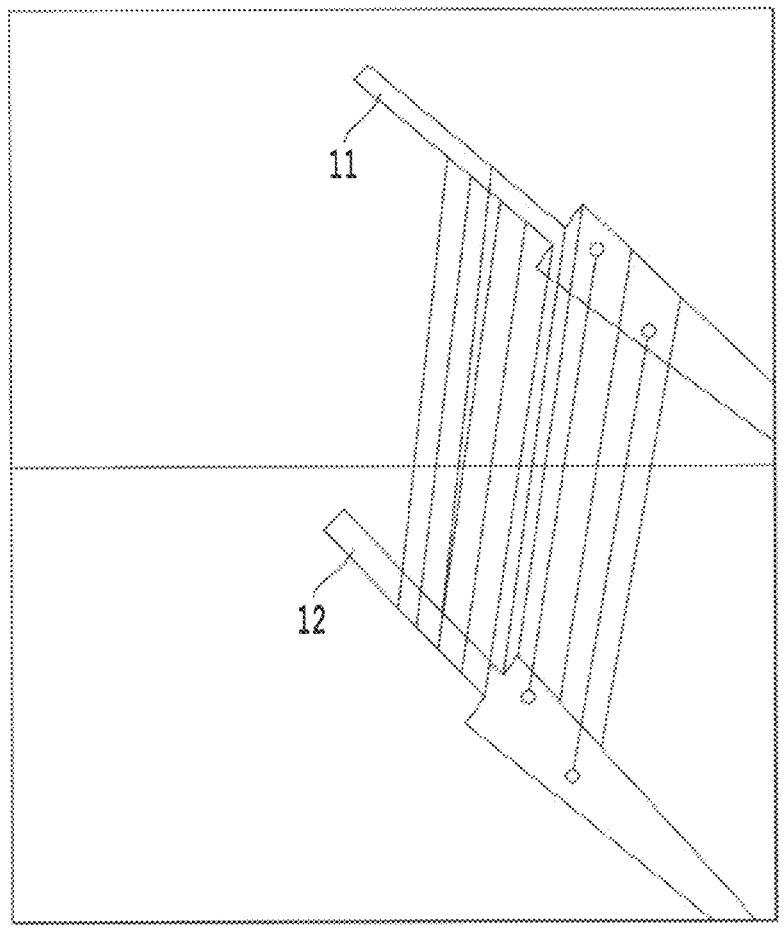
*Fig.4B*
*Fig.4C*
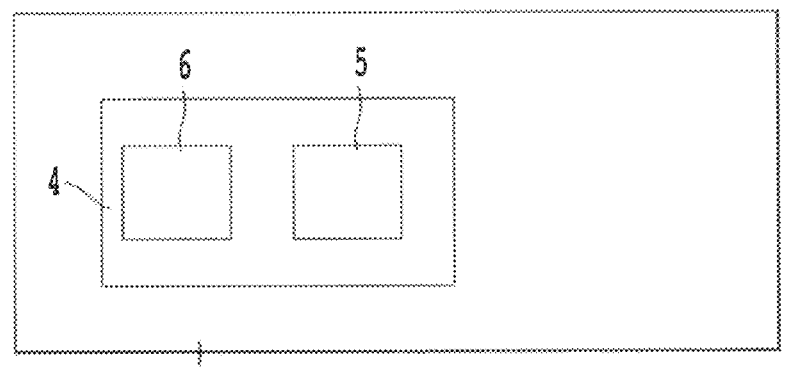
*Fig.5*

METHOD AND DEVICE FOR DETERMINING CALIBRATION PARAMETERS OF A CAMERA

BACKGROUND OF THE INVENTION

1. Field of the Invention

This specification relates to a method and a device for determining calibration parameters of a camera. Moreover, the specification relates to a method of controlling calibration parameters of a camera, to a computer program product and a computer readable storage medium. In addition, the specification relates to a camera comprising such a device.

2. Discussion of the Related Art

Recently, driving-assistance systems have been developed that comprise a camera which monitors the motion of the vehicle as well as the surroundings thereof. For example, these cameras may take images of the neighboring lane so as to detect neighboring vehicles and to alert the driver of the subject vehicle if he desires to change the lane, for example. In order to obtain a precise monitoring, camera calibration is an essential issue. Generally speaking, the camera calibration establishes the relationship between the 3D environment and its projection onto the image plane. The extrinsic parameters of a specific camera describe the relative position and orientation of the camera with respect to the world coordinate system. For example, the extrinsic parameters may be found through the extrinsic calibration. In addition, the intrinsic parameters of the camera model the projection of points from the camera coordinate system onto the image plane. For example, the intrinsic parameters comprise focal length, optical center etc.

Conventionally, camera calibration has been performed using known calibration objects. For example, after assembly of the vehicle or during an inspection such a calibration is performed with the camera using known calibration objects. Accordingly, the calibration parameters are estimated offline and used statically as initial values by the system. Generally, the intrinsic parameters of the camera are static. However, the extrinsic parameters can change slightly during use, e.g. caused by mechanical influences. However, wrong extrinsic calibration information will have a critical effect on the performance of the complete system. Accordingly, an automatic or self-calibration of the extrinsic parameters during runtime is desired. Therefore, a need exists for developing a method and a device of determining extrinsic calibration parameters of a camera.

US 2009/0290032 relates to a self calibration of extrinsic camera parameters for a vehicle camera.

It is an object of the present invention to provide an improved method and an improved device for determining calibration parameters of a camera. The above objects are solved by the claimed matter according to the independent claims.

The accompanying drawings are included to provide a further understanding of embodiments of the invention and are incorporated in and constitute a part of this specification. The drawings illustrate the embodiments of the present invention and together with the description serve to explain the principles. Other embodiments of the invention and many of the intended advantages will be readily appreciated, as they become better understood by reference to the following detailed description. The elements of the drawings are not necessarily to scale relative to each other. Like reference numbers designate corresponding similar parts.

BRIEF DESCRIPTION OF THE DRAWINGS

FIG. 3 schematically illustrates a method of assessing corresponding feature areas of two different images;

FIG. 4A shows a superposition of two images and illustrates a method of finding corresponding feature points in the superposed images;

FIGS. 4B and 4C schematically illustrate a method of finding corresponding feature points in two different images;

FIG. 5 schematically illustrates a device for determining calibration parameters.

DETAILED DESCRIPTION OF THE EMBODIMENTS

In the following detailed description reference is made to the accompanying drawings, which form a part hereof and in which are illustrated by way of illustration specific embodiments in which the invention may be practiced. In this regard, directional terminology such as "top", "bottom", "front", "back", "leading", "trailing" etc. is used with reference to the orientation of the Figures being described. Since components of embodiments of the invention can be positioned in a number of different orientations, the directional terminology is used for purposes of illustration and is in no way limiting. Is to be understood that other embodiments may be utilized and structural or logical changes may be made without departing from the scope defined by the claims.

Figure 1A:
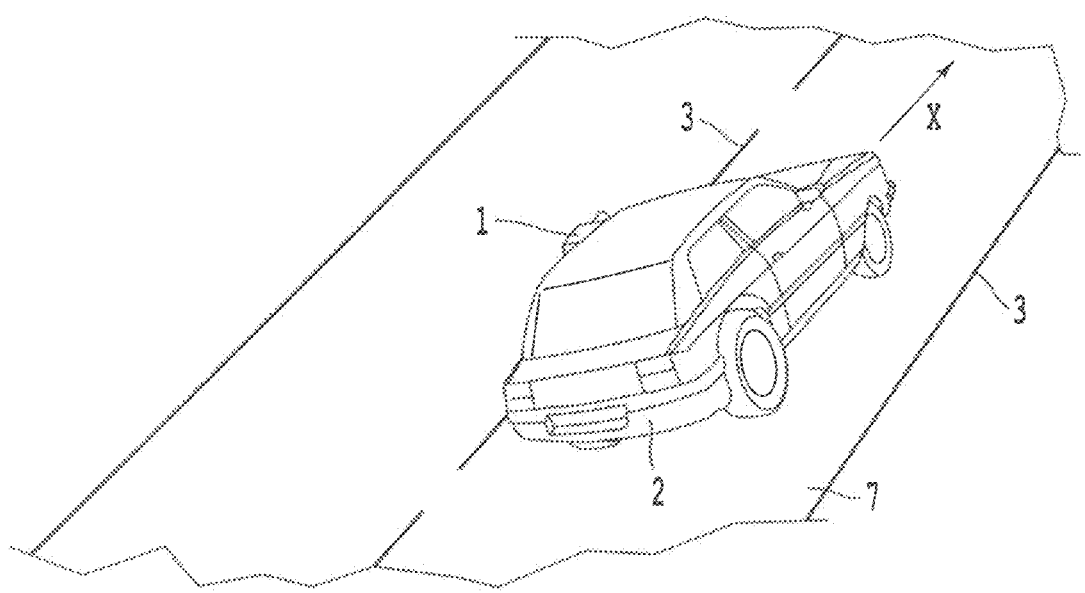
FIG. 1A is an illustration of a vehicle on a road, the vehicle including a camera.
Figure 1B:
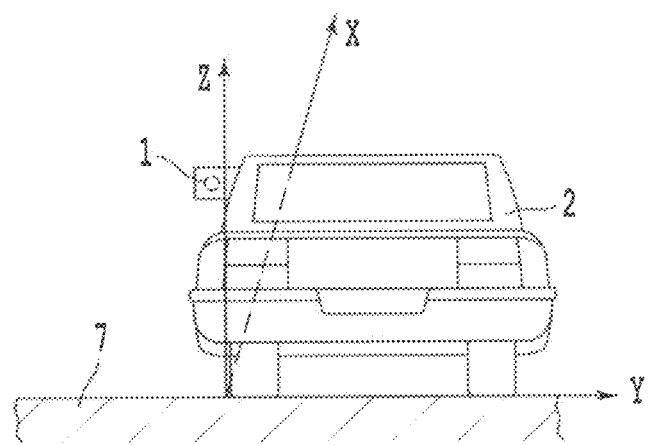
FIG. 1B is a schematic illustration of extrinsic parameters and a coordinate system.

FIG. 1A illustrates a moving vehicle 2 comprising a camera 1 that is attached to the moving vehicle 2. The vehicle 2 is moving on a road 7. Lane markings 3 are present on the road surface. FIG. 1B shows the position of the camera 1 with respect to the world coordinate system. For the purpose of description, a world coordinate system is considered, which origin is located directly below the camera and additionally is part of the road surface. Accordingly, the intersection of a plumb line fixed in the origin of the camera coordinate system and the plane of the road surface defines the origin of the world coordinate system. The z-axis of the world coordinate system is pointing towards the camera, whereas the x-axis is pointing parallel to the lateral profile of the car (direction of travel). As a result, the plane defined by the x- and y-axis describes approximately the road surface (it is assumed that the road is flat in the close vicinity to the location that is being analyzed). This specific definition of the world coordinate system can be chosen without loss of generality.

In the context of the present specification, the extrinsic parameters of the camera comprise the relative position and the orientation of the camera with respect to the world coordinate system. The relative position of the camera with respect to the world coordinate system is fixed to the relative position of the vehicle. Further, the height of the camera $h_C$ is a parameter to be determined as well as the extrinsic rotation matrix $R_e$ of the camera with respect to the vehicle. According to the present embodiment, it is assumed that the height $h_C$ is constant and will not be changed. Nevertheless, as will become easily understood from the following specification, the method and system may be easily adapted to the case in which the height may be variable and, thus, may be estimated.

The camera 1 that may be used in the context of the present specification may be any kind of known camera. For example, the camera may be a stereo or a mono ocular camera or video system. Moreover it may be a camera using a detection mechanism based on any analog or digital detecting method.

Figure 2:
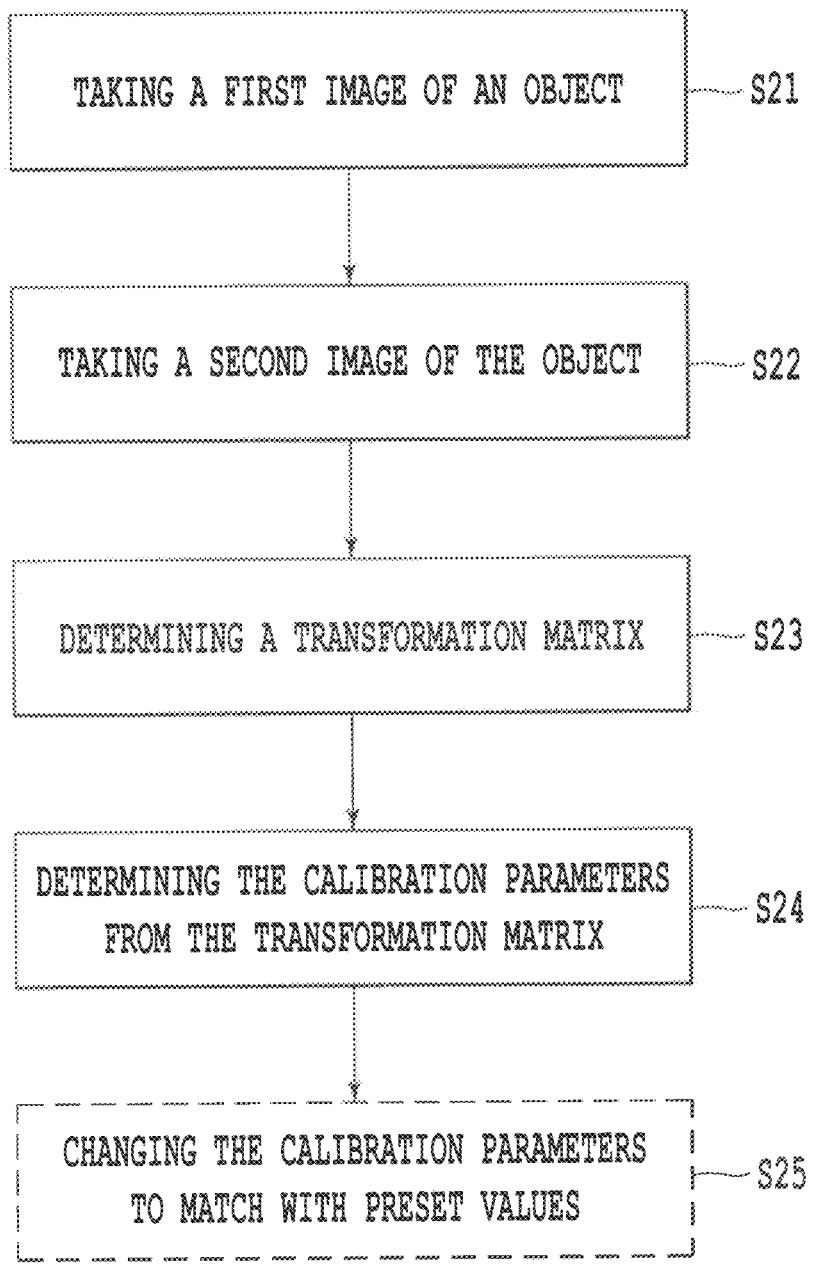
FIG. 2 schematically illustrates the method of determining calibration parameters according to an embodiment.

FIG. 2 schematically illustrates a method according to an embodiment. As is shown in FIG. 2, a method of determining calibration parameters of a camera may comprise taking a first image of an object (S21), taking a second image of the object (S22), wherein the position of the camera with respect to the object is changed between the first and the second image, the calibration parameters of the camera being fixed between the first and the second image, determining a transformation that is adapted to transform a portion of the first into a corresponding portion of the second image (S23), and determining the calibration parameters from the transformation matrix (S24). As is also indicated in FIG. 2, a method for controlling calibration parameters of a camera may additionally comprise changing the calibration parameters to match with preset values (S25).

It is not intended that the terms "first" and "second" image of an object necessarily mean that the first image is taken before a camera movement and the second image is taken after the camera movement. Likewise, the second image may be taken before the camera movement, and the first image may be taken after the camera movement.

The term "object" may, for example, comprise a specific plane, such as a street including markings. Nevertheless, the object may as well be implemented by a specific road marking or any other element that forms part of a plane. The term "transformation" may relate to any kind of transformation that is adapted to transform a portion of the first into a corresponding portion of the second image. An example of such a transformation may be the projective transformation. The transformation may, for example, be implemented by a matrix or by any other suitable representation.

For example, determining the transformation matrix may comprise assessing at least one feature point of the second image that corresponds to a feature point of the first image and determining the transformation matrix that transforms the feature point of the first image into the feature point of the second image. Moreover, assessing the at least one feature point of the second image may comprise determining an epipolar geometry on the basis of a reference object in the first image and in the second image, and determining the feature point of the second image from the feature point of the first image and a line generated on the basis of the epipolar geometry. Utilizing this method, determining the feature point of the second image may be simplified, with a reduced risk of finding an incorrect feature point.

According to a further embodiment, determining the transformation may comprise assessing at least one feature area of the second image that corresponds to a feature area of the first image, and determining the transformation that is adapted to transform the feature area of the first image into the feature area of the second image. For example, assessing the at least feature area of the second image may comprise determining a feature area of the second image having a maximum of similarity to the corresponding feature area of the first image. According to a further embodiment, more than one feature areas may be used for determining the transformation.

According to a further embodiment, determining the transformation may comprise assessing at least two different feature points of the second image that correspond to two different feature points of the first image, respectively, and determining the transformation that is adapted to convert the feature points of the first image into the feature points of the second image.

Generally, the perspective transformation describes the pixel displacement for a given camera projection, camera motion and a plane located with respect to one of the camera perspectives. Accordingly, on the basis of four corresponding feature pairs that are present in a first and a second image, a transformation matrix may be assessed for calculating the transformation from the first to the second image. For implementing this method, it is required that the feature pairs of the first and the second image lie on the same plane. Moreover, the epipolar geometry describes the relationship between two different images that are taken of one single object from two different camera positions. The epipolar geometry takes into account all corresponding feature points found in the two images taken by the camera independently of whether they are located on the road surface or not. In general, an essential matrix may be estimated from the coordinates of corresponding feature pairs without knowledge of the extrinsic calibration parameters.

Assuming the orientation of the world coordinate system as has been described above with respect to FIG. 1B, the perspective transformation can be written as follows:

$$H = R_e \left( R_w + \frac{t_w n_w^T}{-h_c} \right) R_e^T,$$

with $n_w = [0\ 0\ 1]^T$, where H is the transformation matrix, $R_e$ the extrinsic rotation matrix, $R_W$ and $t_W$ the rotation and translation in the world coordinate system and $h_C$ the height of the camera. In this case, the complete extrinsic calibration parameters are described by $R_e$ and $h_C$, because $$t_e = -R_e t_h, \text{ with } t_h = [0\ 0\ h_c]^T.$$

According to an embodiment, it is assumed that the motion of the vehicle the camera is attached to is known with respect to the world coordinate system. This motion is described by $R_W$ and $t_W$. For example, $t_W$ and $R_W$ may be estimated from the velocity (wheel speed) and the yaw rate sensor. In this case, the transformation matrix H may be derived from the following equation:

$$H = R_e H_w R_e^T,$$

with $H_w = R_w + \frac{t_w n_w^T}{-h_c}$.

A rotation matrix is orthonormal, accordingly only 3 degrees of freedom (DOF) remain. Hence, the complexity of the transformation may be further reduced. The transformation may be further simplified by utilizing the properties of the epipolar geometry. As is generally known the Essential matrix of the epipolar geometry may be estimated from the coordinates of corresponding feature pairs without knowledge of the extrinsic calibration parameters. The Essential matrix may be decomposed into a rotation matrix $R_{epi}$ and a translation vector $t_{epi}$. Utilizing the relation $$t_{epi} = R_e t_w,$$

the length of the vector $t_{epi}$ can be derived because $$|t_{epi}| = |t_w|$$

has to be true. The reason for that is that the length of the vector is not changed due to rotation. Moreover, only a one-dimensional set of rotation matrices may transform a vector to another. As a consequence, just one DOF remains. This means that the rotation matrix comprises only one parameter $R_e(\alpha)$ and the transformation may be expressed by the transformation matrix H that depends from one parameter $H(\alpha)$.

As will be readily understood from this specification, the above relations can easily be extended to a case in which the camera height varies and in which the camera height is estimated as a further extrinsic calibration parameter.

For implementing the present embodiment, one feature area of the second image may be assessed that corresponds to a feature area of the first image and the transformation may be determined that is adapted to transform the feature area of the first image into the feature area of the second image. FIGS. 3A and 3B illustrate a method according to this implementation. FIG. 3A shows a first image of a road surface. As is shown, road markings 3 are present on the road surface 7. Moreover, FIG. 3B shows a second image of the road surface 7 that is taken after the camera has moved with respect to the road surface. Next, a block 8 having an arbitrary shape constituting a specific area 8 is selected from the first image. Then, the transformation matrix is computed for different values of α and the block is transformed into a block of the second image utilizing these different matrices. For example, on the basis of four different values for α, four different transformation matrices are computed so as to obtain the four different blocks 9A, 9B, 9C, 9D illustrated in FIG. 3B. Thereafter, the similarity between each of the blocks 9A, 9B, 9C, 9D shown in FIG. 3B and the block 8 shown in FIG. 3A is assessed. The block of FIG. 3B having the highest degree of similarity to the block shown in FIG. 3A corresponds to the "correct" transformation matrix and hence the correct value of α. From this value for α the rotation matrix $R_e(\alpha)$ may be computed, thus yielding the correct extrinsic calibration parameter. For example, the similarity may be assessed by deriving a descriptor that describes the local appearance of image information of a specific point of the block shown in FIG. 3A and a transformed point shown in a block in FIG. 3B. For example, the brightness of a specific feature point may be compared with each other. For example, both blocks may be compared by calculating the sum of absolute differences (SAD), the sum of squared differences (SSD), the normalized cross-correlation, the correlation coefficient or any other method that compares two sets of data.

On the basis of this comparison of similarity between the blocks, the most similar block is assessed. From this most similar block, the transformation matrix corresponding to this block is determined, and from the transformation matrix the extrinsic calibration parameters are assessed. According to a modification, a measure of the dissimilarity may be used, and the transformation matrix resulting in the block having a minimum of dissimilarity may be searched for.

In other words, a transformation relation is determined that describes the changed appearance of a block shown in FIG. 3A best, when the camera position is changed, and the extrinsic parameters are assessed from this transformation relation. In this respect, two different images that have been taken before and after a specific movement, are compared. Accordingly, starting from the image before the movement, it can be investigated how a specific area has been changed after the movement. As an alternative, starting from the image after the movement, it can as well be investigated, how a specific area has been before the movement.

As becomes readily apparent, the image of FIG. 3A may have been taken before or after taking the image of FIG. 3B. Differently stated FIG. 3A may show the street before or after moving the camera. Hence, a transformation may as well be determined that is adapted to transform a feature area of the later image into the feature area of the earlier image.

According to a further embodiment, the transformation matrix may be determined by finding at least one feature point of the second image that corresponds to a feature point of the first image. From these two feature points the transformation matrix may then be determined. For example, if one feature pair is correctly identified, there is normally just one value of α whose homographic matrix transforms one point to the other. According to an embodiment, the pair of corresponding feature points may be identified by utilizing the epipolar geometry. Generally, the epipolar geometry defines a line on which potential corresponding feature points are disposed. For example, the epipolar geometry may be assessed by comparing the images of one or more objects, wherein the images have been taken from different camera positions. The exact camera position need not to be known. Moreover, it is not necessary that the object lies on the road surface. Accordingly, a characteristic object such as a tree, a traffic sign or a building may be taken as an object.

FIG. 4A illustrates this embodiment. FIG. 4A shows elements 11, 12 of two superimposed pictures of a road surface 7, two corresponding points A, B and a line 13 that connects corresponding points. The line 13 is determined utilizing the epipolar geometry, for example, by comparing the images of the road sign 14, 15. Accordingly, if feature point A of element 11 and the line 13 are known, the corresponding feature point B of the element 12 must lie on line 13. Hence, the search for the corresponding feature point may be simplified.

According to the present embodiment, for example, a feature point may be selected by criteria which describe the local uniqueness. For example, the feature point may be selected in such a manner that the appearance of the surrounding area changes a lot, if the point is shifted. This sensibility of shifting should not be restricted to one spatial dimension. For example, the uniqueness of the point may be especially distinct along the epipolar line, and the uniqueness of the point may be low perpendicular to the direction along the epipolar line because the correct corresponding feature point will be found to lie on the epipolar line.

According to an embodiment, some pre-filter steps may be performed. According to further embodiments, the feature points may not be pre-filtered before performing the transformation, but the solutions may be post-filtered. For example, points on the road will end always in the same solution or, if noise is present, in similar solutions. However, all other points are distributed over all possible solutions. Accordingly, a filter could be implemented that selects the solution which was most frequently found as the correct one. This may be applied in a case in which there are more than one feature point available in one frame (inter-frame solutions) or if there are feature points selected in other frames (intra-frame solutions). Since the extrinsic parameters do not change so much over time, the intra-frame principle is applicable with just one feature pair per frame or in combination with the inter-frame principle.

As a further option, the field of pattern recognition may be used in order to classify whether a point is part of the road surface or not. For example, lane markings are suited for classification, because they are printed most of the time directly on the road and have a very characteristic appearance to differentiate between points which are not part of the road. According to a further approach, points on the road may be selected by restricting the underlying feature selection only to areas in the image, where the road surface is expected. For implementing this approach, the extrinsic parameters should be known, but for many applications or with an existing offline calibration, the image can already be partitioned reasonably.

This is, for example, implemented in FIGS. 4B and 4C. FIGS. 4B and 4C show a first image and a transformed second image, respectively, wherein only the portion of the image corresponding to the road surface is analyzed. In FIG. 4B, the horizontal direction of the transformed images is in line with the epipolar lines, and the vertical direction of the images is perpendicular to the epipolar lines. The search of corresponding feature points can be simplified using the epipolar geometry of the two camera positions, as has been explained above with reference to FIG. 4A. Since corresponding feature points are disposed on the epipolar line, a good feature point has for example a high variance along the epipolar line (horizontal direction in the present example) and a low gradient perpendicular to the epipolar line (vertical direction in the present example). The corresponding feature point is located on the epipolar line. Restriction of the region to be analyzed to that area of the image where the road surface is expected is very helpful in order to reduce the range of feature detection to a smaller range, so that the detection may be further simplified and the effort of finding corresponding features will be reduced.

According to the embodiment described above, the movement ($R_W$ and $t_W$) of the vehicle, to which the camera is attached, is considered to be known. According to a further embodiment, the extrinsic parameters may be determined without the knowledge of the vehicle movement. For example, under the assumption that the vehicle will not turn at all, $R_W=I$ (unity matrix), and that the vehicle moves mainly along the defined x-axis of the world coordinate system ($t_W=-[\Delta S\ 0\ 0]^T$). Assuming that there are short time intervals between the first and the second image, this relation holds true. In this case, the Essential matrix of the epipolar geometry may be expressed as $E=[t_{epi}]_x R_{epi}$, wherein $R_{epi}=I$ and $$[t_{epi}]_x = \begin{vmatrix} 0 & -t_z & t_y \\ t_z & 0 & -t_x \\ -t_y & t_x & 0 \end{vmatrix}.$$

As is readily to be understood, the Essential matrix may as well be determined, when $R_{epi}$ is different from I, that is, when the vehicle turns and rotation takes place.

In the context of the present specification, the determination of E is deemed to be known.

Under the above assumption that $R_{epi}=I$, the transformation for one feature pair may be expressed as follows:

$$[(x_2-x_2')(x_1'-x_1)(x_1x_2'-x_2x_1')][t_x t_y t_z]^T=0, \text{ wherein}$$

$$[t_x t_y t_z]^T=t_{epi}.$$

It is possible to solve the system of equations with two points and the constraint $$\|[t_x t_y t_z]^T\|=1.$$

Utilizing this equation, the result may be stabilized and the calculating time may be reduced. As a result, the probability to find an uncorrupted feature point is much higher with these two points than according to conventional methods. Further, the transformation matrix for transforming the feature points into the corresponding feature points may be further simplified:

$$H = I + R_e \Theta R_e^T,$$

$$\text{with } \Theta = \begin{pmatrix} 0 & 0 & \theta \\ 0 & 0 & 0 \\ 0 & 0 & 0 \end{pmatrix},$$

$$\theta = \frac{\Delta s}{h_c}.$$

According to this embodiment, two unknown parameters are remaining: one parameter for the rotation matrix and one represented by θ. Hence, two feature pairs are needed in order to calculate both parameters independently from each other. According to the present embodiment, if two feature pairs in the first and the sec- and image are available, the parameters θ as well as the parameter for the rotation matrix may be analytically computed. The transformation matrix may be rewritten:

$$H=I+\theta(r_1 r_3^T), \text{ with } R_e=(r_1 r_2 r_3).$$

In the above equations, the normalized vector $-t_{epi}/\|t_{epi}\|$ is the first column vector of the rotation matrix, because of the definition $t_{epi}=R_e \cdot t_w$ and the fact that $t_w=-[\Delta s\ 0\ 0]^T$.

The third column vector $r_3$ is, as a consequence, a unit vector of the plane, whose normal vector is $r_1$. The vector can be subsequently parameterized by one parameter (1 DOF). Finding this parameter, i.e. finding $r_3$ ends in the complete extrinsic parameters, because $$r_2=-r_1 \times r_3.$$

One feature pair $$(x' \leftrightarrow x)$$

$$x' = \begin{pmatrix} x_1' \\ x_2' \\ 1 \end{pmatrix},$$

$$x = \begin{pmatrix} x_1 \\ x_2 \\ 1 \end{pmatrix}$$

inserted in the homography matrix results in the equation:

$$\lambda x'=x+\theta\mu r_1, \text{ with } \mu=r_3^T x.$$

The factor λ represents the scale-invariant property of projective transformations. The equation can be converted to:

$$\eta = \theta\mu = \frac{x_1 - x_1'}{x_1' r_{31} - r_{11}},$$

or $$\eta = \theta\mu = \frac{x_2 - x_2'}{x_2' r_{31} - r_{21}}.$$

The results are equal if the epipolar geometry is fulfilled, but θ·μ is associated multiplicatively. At this step, the similarity between the concept using the single-point method and the two-point method may be illustrated. Originally $$\theta = \frac{\Delta s}{h_c}.$$

If θ is assumed to be known, μ can be calculated and consequently $r_3$ as well (the extrinsic parameters) with only one feature pair (single-point method).

Otherwise, if θ is not known and no odometry information is available, at least two points are examined in order to result in different (two-point method). Usually, μ changes for a different point x, but θ remains the same. Accordingly, the following equation is obtained:

$$\mu_i - \mu_j \frac{\eta_i}{\eta_j} = 0,$$

with i≠j, for the two feature pairs $x_i \leftrightarrow x_i''$ and $x_j \leftrightarrow x_j'$.

Finally, the extrinsic parameters can be calculated similarly along with θ.

According to a modification, assuming that the height hc is variable, the camera height may be determined using the relation:

$$h_c = \frac{\Delta s}{\theta_{odo}}$$

According to a further embodiment even if the velocity and the rotation of the vehicle is known, the two-point method may be applied to result with the value of the velocity $\theta_{vis}$. In comparison to this value, the value of θ can also be computed with a knowledge of the vehicles movement $$\theta_{odo} = \frac{\Delta s}{h_c}.$$

Accordingly, a discrepancy between both values of θ can be analyzed in order to correctly adjust the parameters of the car. Usually, the velocity sensors are implemented by wheel speed sensors. Accordingly, an uncertainty about the wheel diameter will result in an incorrect vehicle velocity that greatly affects the measurement accuracy of the extrinsic parameters. In this case, the wheel circumference as well as the camera height may be corrected.

For example, there may be different reasons why the measured $\Delta s_{mes}$ is wrong:

The sensor is expecting a wrong wheel circumference. The error has a multiplicative nature: $\Delta s_{real} = \lambda \Delta s_{mes}$ (This error covers also a wrongly assumed camera height). Further, the wheel circumference is getting higher if the rotational frequency increases. There are models of the wheel of the form: λ(ω).

Depending on the considered errors, λ itself or any parameters used in the error modeling can be estimated using parameter estimation methods.

Once the considered dependency is known, a combined approach (consisting of the single- and two-point algorithm) can be formed.

As has been explained above, due to the exploitation of the knowledge of the vehicles motion, the original 8 degrees of freedom of a general projective transformation has been reduced. Accordingly, the calibration parameters may be estimated on the basis of less feature pairs or a lower dimension of the underlying parameters space. As a result, more accurate and faster estimations are obtained. Further, it is not necessary for the calibration objects (of the known size) to be visible to the camera nor for other elements such as the horizon, lane markings, etc. to be recognized. The present embodiments may be implemented on the basis of a plane that is linked together with the world coordinate system. In particular, it is not necessary that the plane is a real plane. An assumed virtual plane may be utilized for calibration as well.

As has been described above, the epipolar geometry is combined with a projective geometry, whereby, for example, the result may be improved. In addition, the epipolar geometry reduces the complexity of the feature extraction.

FIG. 5 shows an example of a device for determining calibration parameters of a camera. The device 4 shown in FIG. 5 comprises an analyzing device 5 for analyzing a first and a second image of an object, wherein the position of the camera with respect to the object is changed between the first and the second image, the calibration parameters of the camera being fixed between the first and the second image. Moreover, the device comprises a calculating device 6 that is adapted to determine a transformation that is adapted to transform a portion of the first into a corresponding portion of the second image and to determine the calibration parameters from the transformation. For example, the device 4 for determining calibration parameters may form part of the camera or may be a device that is separate from the camera 1.

The method as has been described above, may be implemented by a computer program to form a computer program product. Further, this computer program product mainly stored on a computer readable storage medium.

The method and device which have been explained above may also be applied in fields that are different from driving-assisting systems. For example, the method and device may also be applied in robotics and others. To be more specific, the method and device may be used whenever a camera is moved with known movement in world coordinates or without any rotation. Moreover, the method and device described may also be applied whenever a movement takes place between the camera and an object. This may be, for example, useful in the field of atomization where the camera is mounted statically and a planar conveyor belt is visible by the camera. Due to their presence on the conveyor belt, the feature points are disposed on one single plane.

While embodiments of the invention have been described above, it is obvious that further embodiments may be implemented. Accordingly, this spirit and scope of the appended claims should not be limited to the description of the embodiments contained herein.

The invention claimed is:

1. A method of determining calibration parameters of a camera, comprising:
    taking a first image of an object;
    taking a second image of the object, wherein the position of the camera with respect to the object is changed between the first and the second image, the calibration parameters of the camera being fixed between the first and the second image;
    selecting a first block, defining a first feature area image, within the first image;
    transforming, using a plurality of transformation matrices having different rotation matrices, the first block within the first image to a plurality of blocks within the second image, the plurality of blocks defining a plurality of feature area images, each transformation matrix corresponding to one of the plurality of blocks, and each transformation matrix having the form $$H = R_e \left( R_w + \frac{t_w n_w^T}{-h_c} \right) R_e^T, \text{ with } n_w = [0 \ 0 \ 1]^T, \text{ where}$$

H is a transformation matrix,
$R_e$ is a rotation matrix,
$R_w$ is a rotation in the world coordinate system, $t_w$ is a translation in the world coordinate system, and
$h_c$ is a height of the camera;

comparing the first feature area image with each of the plurality of feature area images within the second image to determine a degree of similarity between the first feature area image and each of the plurality of feature area images;

assessing a second feature area image within the second image that corresponds to the first feature area image, the second feature area image being one of the plurality of feature area images that has a highest degree of similarity with the first feature area image;

determining a transformation matrix of the plurality of transformation matrices that is adapted to transform the first feature area image into the second feature area image; and determining the calibration parameters from the transformation matrix to calibrate the camera.

2. A non-transitory computer readable program product storing a computer program, which when executed by a processor in an electronic device, causes the processor to carry out the method according to claim 1.

3. The non-transitory computer readable program product of claim 2, wherein the assessing the degree of similarity further includes assessing a similarity of a specific feature point of the first feature area image to a specific feature point of each of the plurality of feature area images within the second image.

4. The non-transitory computer readable program product of claim 2, wherein the first feature area image has an arbitrary shape.

5. The method of claim 1, wherein the assessing the degree of similarity further includes assessing a similarity of a specific feature point of the first feature area image to a specific feature point of each of the plurality of feature area images within the second image.

6. The method of claim 1, wherein the first feature area image has an arbitrary shape.

7. A method of controlling calibration parameters of a camera, the method comprising:

taking a first image of an object;

taking a second image of the object, wherein the position of the camera with respect to the object is changed between the first and the second image, the calibration parameters of the camera being fixed between the first and the second image;

selecting a first block, defining a first feature area image, within the first image;

transforming, using a plurality of transformation matrices having different rotation matrices, the first block within the first image to a plurality of blocks within the second image, the plurality of blocks defining a plurality of feature area images, each transformation matrix corresponding to one of the plurality of blocks, and each transformation matrix having the form $$H = R_e \left( R_w + \frac{t_w n_w^T}{-h_c} \right) R_e^T, \text{ with } n_w = [\,0\ \ 0\ \ 1\,]^T, \text{ where}$$

H is a transformation matrix,
$R_e$ is a rotation matrix,
$R_w$ is a rotation in the world coordinate system,
$t_w$ is a translation in the world coordinate system, and
$h_c$ is a height of the camera;

comparing the first feature area image with each of the plurality of feature area images within the second image to determine a degree of similarity between the first feature area image and each of the plurality of feature area images;

assessing a second feature area image within the second image that corresponds to the first feature area image, the second feature area image being one of the plurality of feature area images that has a highest degree of similarity with the first feature area image;

determining a transformation matrix of the plurality of transformation matrices that is adapted to transform the first feature area image into the second feature area image;

determining the calibration parameters from the transformation matrix; and changing the calibration parameters to match with preset values to calibrate the camera.

8. A calibration device for determining calibration parameters of a camera, comprising:

an analyzing device to analyze a first and a second image of an object, wherein the position of the camera with respect to the object is changed between the first and the second image, the calibration parameters of the camera being fixed between the first and the second image; and a calculating device to
select a first block, defining a first feature area image, within the first image;

transform, using a plurality of transformation matrices having different rotation matrices, the first block within the first image to a plurality of blocks within the second image, the plurality of blocks defining a plurality of feature area images, each transformation matrix corresponding to one of the plurality of blocks, and each transformation matrix having the form $$H = R_e \left( R_w + \frac{t_w n_w^T}{-h_c} \right) R_e^T, \text{ with } n_w = [\,0\ \ 0\ \ 1\,]^T, \text{ where}$$

H is a transformation matrix,
$R_e$ is a rotation matrix,
$R_w$ is a rotation in the world coordinate system,
$t_w$ is a translation in the world coordinate system, and
$h_c$ is a height of the camera;

compare the first feature area image within the first image with each of the plurality of feature area images within the second image to determine a degree of similarity between the first feature area image and each of the plurality of feature area images, assess a second feature area image within the second image that corresponds to the first feature area image, the second feature area image being one of the plurality of feature area images that has a highest degree of similarity with the first feature area image, determine a transformation matrix of the plurality of transformation matrices that transforms the first feature area image within the first image into the corresponding second feature area image within the second image, and determine the calibration parameters from the transformation matrix.

9. A camera comprising the calibration device for determining calibration parameters of a camera according to claim 8.

* * * * *